United States Patent [19]
Kuz et al.

[11] Patent Number: 5,632,796
[45] Date of Patent: May 27, 1997

[54] PIPING ARRANGEMENT FOR PERMITTING VERTICAL ADJUSTMENT OF A GLASSWARE FORMING MACHINE

[75] Inventors: Zdenko Kuz, Zug; Willi Meyer, Effretikon, both of Switzerland

[73] Assignee: Emhart Glass Machinery Investments Inc., Wilmington, Del.

[21] Appl. No.: 392,434

[22] Filed: Feb. 22, 1995

[30] Foreign Application Priority Data

Feb. 24, 1994 [GB] United Kingdom ............... 9403560

[51] Int. Cl.⁶ ........................................ C03B 11/06
[52] U.S. Cl. .................. 65/322; 65/229; 65/261; 65/300; 65/362
[58] Field of Search .................... 65/226, 229, 261, 65/300, 302, 305, 308, 321, 322, 362

[56] References Cited

U.S. PATENT DOCUMENTS

| | | | |
|---|---|---|---|
| 4,662,923 | 5/1987 | Vajda et al. | 65/160 X |
| 5,028,249 | 7/1991 | Trahan et al. | 65/362 X |
| 5,358,543 | 10/1994 | Kozora | 65/362 X |
| 5,411,564 | 5/1995 | Bolin | 65/362 X |

*Primary Examiner*—Milton Cano
*Attorney, Agent, or Firm*—Spencer T. Smith

[57] ABSTRACT

An arrangement in a glassware forming machine for connecting a supply of operating air to a mechanism mounted in a frame of the machine, which mechanism may need to be adjusted in position vertically in the machine comprises a flexible pipe which connects the mechanism to a supply of operating air, and a sleeve for permitting a change of length of the pipe so that adjustment of the mechanism can be accommodated.

6 Claims, 2 Drawing Sheets

PIPING ARRANGEMENT FOR PERMITTING VERTICAL ADJUSTMENT OF A GLASSWARE FORMING MACHINE

This invention is concerned with arrangements in a glassware forming machine for connecting a supply of operating air to a mechanism mounted in a frame of the machine, which mechanism may need to be adjusted in position vertically.

BACKGROUND TO THE INVENTION

In a glassware forming machine of the individual section type there are a number of mechanisms, conventionally pneumatically operated, which from time to time (for example when the size of ware being manufactured changes) need to be adjusted in position vertically. Such a mechanism is the plunger mechanism which is used to form a parison in the operation of glass machines, and a plunger mechanism requires the supply of operating air—that is to say compressed air, vacuum and exhaust—for its operation.

If the operating air were to be supplied to the plunger mechanism through rigid piping, it would be necessary to replace the piping on any significant vertical adjustment of the mechanism. Flexible piping is therefore generally used. However, to allow for vertical adjustment of the mechanism, the flexible piping is normally much longer than the direct distance between the point at which the air is supplied to the mechanism and the point on the machine frame from which the air is supplied. To a conventional plunger mechanism it is usually necessary to provide for each plunger five pipes to supply operating air to the mechanism, respectively for, plunger operating up, plunger operating down, vacuum, thimble up, and plunger cooling or counter blow (depending on the process being used). Thus for a triple gob mechanism fifteen pipes are crowded into a confined space. Consequently the pipes are close to each other, but it is desirable to ensure that the pipes do not touch as this can result in an unduly short pipe life because the pipes move when either compressed air or vacuum is switched on or off and can thus abrade each other.

It is one of the various objects of the present invention to provide an improved arrangement for supplying air to a mechanism in a glass machine.

BRIEF STATEMENT OF THE INVENTION

The present invention provides a piping arrangement in a glassware forming machine which comprises a frame comprising a top plate, a base member and a lateral frame member and an operating mechanism mounted in the frame for vertical adjustment relative to the top plate said arrangement comprising an air supply passage formed in the lateral frame member a block attached to the mechanism and comprising operating air passages for the supply of operating air to the mechanism, and a horizontal air passage opening from an outer face of the block to one of said operating air passages a right angled connector mounted in said horizontal air passage and freely rotatable about the axis of said horizontal air passage flexible pipe means joining the connector to said air supply passage in the lateral frame member means for permitting a change of length of the flexible pipe means so that, on vertical adjustment of the mechanism, the adjustment may be accommodated by rotation of the connector about said axis of said horizontal air passage, flexing of the flexible pipe means and a change of length of the flexible pipe means.

The present invention also provides a piping arrangement in a glassware forming machine which comprises a frame comprising a top plate, a base member and a lateral frame member and an operating mechanism mounted in the frame for vertical adjustment relative to the top plate said arrangement comprising a plurality of air supply passages formed in the lateral frame member a block attached to the mechanism and comprising a corresponding plurality of operating air passages for the supply of operating air to the mechanism, and a corresponding plurality of horizontal air passages opening from an outer face of the block to each of said operating air passages a right angled connector mounted in each said horizontal air passage freely rotatable about the axis of such horizontal air passage flexible pipe means joining each of said connectors to a corresponding air supply passage in the lateral frame member means for permitting a change of length of each such flexible pipe means so that, on vertical adjustment of the mechanism, the adjustment may be accommodated by rotation of each said connector about the axis of the corresponding air passage, flexing of each flexible pipe means and a change of length of the flexible pipe means.

While an arrangement according to the invention is particularly advantageous when used with a plunger mechanism, it can also with advantage be utilised with other mechanisms.

Preferably the block is attached to the mechanism by bolts and can readily be removed therefrom. Conveniently a plunger mechanism is provided with two such blocks secured to a base plate of the mechanism.

There now follows a description, to be read with reference to the accompanying drawings, of an arrangement embodying the invention.

In the accompanying drawings

DESCRIPTION OF THE PREFERRED EMBODIMENT

Figure 1:
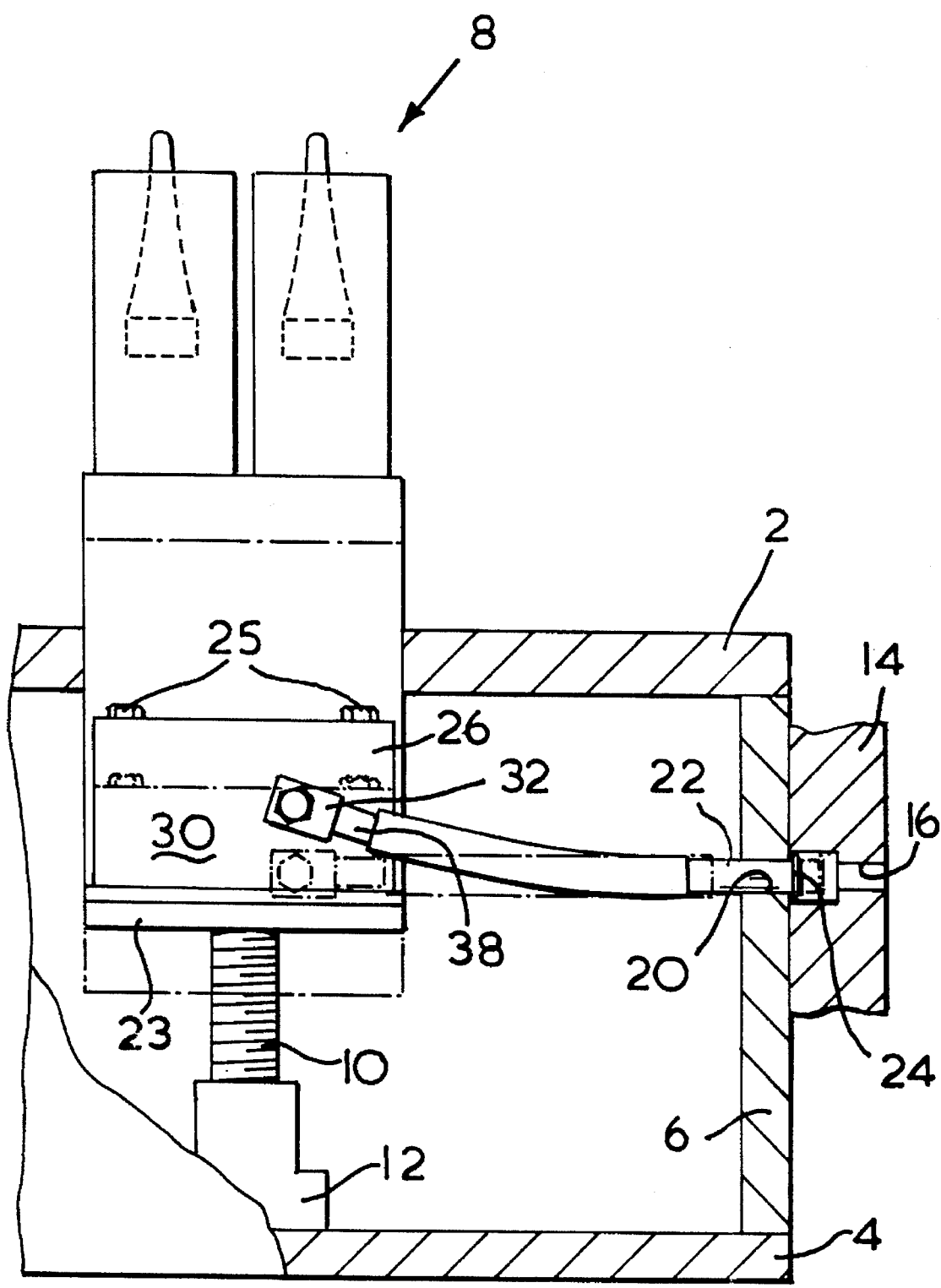
FIG. 1 shows a side view of a plunger mechanism with a piping arrangement embodying the invention.
Figure 2:
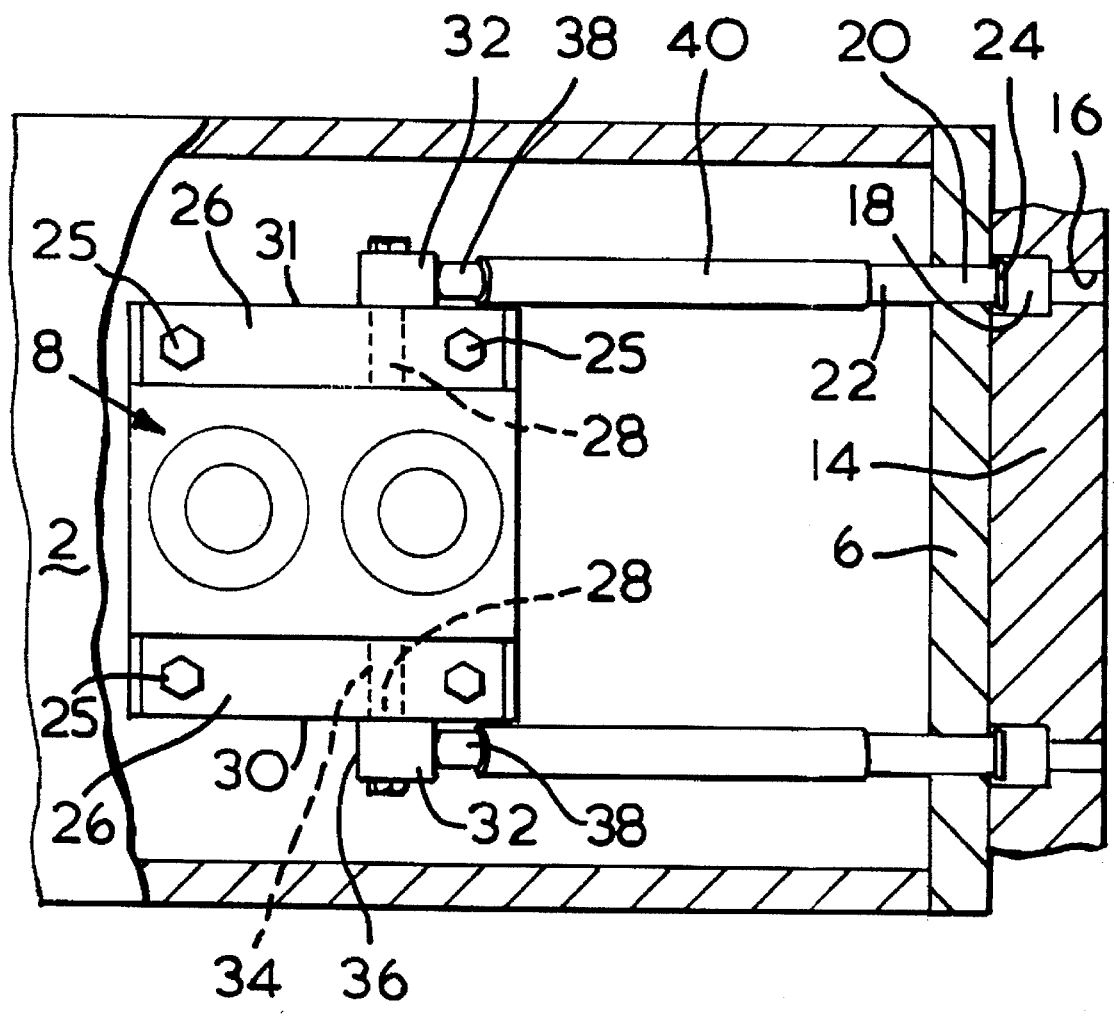
FIG. 2 shows a plan view of FIG. 1.

A glassware forming machine comprises, as shown diagrammatically in the drawings, a frame which comprises a top plate 2, a base member 4 and a lateral frame member 6. Mounted in the top plate 2 for vertical adjustment relative to the top plate is a plunger mechanism whose vertical position is determined by a screw 10 mounted in a bracket 12 secured to the base member 4, i.e. adjustment of the screw 10 by conventional means (not shown) causes up and down movement of the plunger mechanism 8 into its desired position.

The piping arrangement for supplying operating air to the plunger mechanism will now be described.

Secured to the lateral frame member 6 is an inlet block 14 which comprises a series of generally horizontal inlet bores each having a narrower bore portion 16 and a wider bore portion 18: each inlet bore is connected to the operating air supply of the machine or to exhaust.

Each bore portion 18 leads to a generally horizontal air supply passage 20 in the frame member 6. Mounted in the passage 20 for sliding movement therein is a sleeve 22 which has an enlarged head 24 which is positioned in the bore portion 18: the sleeve 22 is capable of restricted axial movement constrained by engagement of the head 24 with ends of the bore portion 18.

Attached to a base plate 23 of the plunger mechanism 8 by bolts 25 are two distributor blocks 26,26 which comprise various operating air passages (not shown) for the distribution of operating air to the base plate 23 of the plunger mechanism 8. [it will be understood that the phrase operating air includes compressed air, vacuum and exhaust].

Each of these operating air passages leads from a corresponding horizontal air passage 28 having an entry opening in an outer face 30 of a forward block 26 or an outer face 31 of the rearward block 26. Mounted in each air passage 28 is a right angled connector 32 comprising a tube 34, which is positioned in the passage 28 and is rotatable about the axis of the passage 28 but constrained against axial movement, a block 36 and a connecting tube 38, at right angles to the tube 34, the block 36 being provided with a passageway which connects the tubes 34 and 38.

A flexible pipe 40 connects the connecting tube 38 of each of the connectors 32 with one of the sleeves 22 mounted in the lateral frame member 6. A flexible pipe 40 together with the sleeve 22 to which it is fixed provides flexible pipe means joining the connector 32 to the air passage 20 and means for permitting a change of length of the flexible pipe means.

It can be seen that if the plunger mechanism 8 is adjusted in vertical position by the screw 10, for example between the full line and the dotted line position shown in FIG. 1, the adjustment may be accommodated by rotation of the connectors 32 about the axes of the air passages 28, flexing of the tubes 40 and horizontal sliding movement of the sleeves 22 in the passages 20.

It will be seen that if it is for any reason desired to remove the piping arrangement from the machine, for example for replacement, it can readily be removed simply by undoing the bolts 25 to release the blocks 26 and by detaching the pipes 40 from their associated sleeves 22.

We claim:

1. A piping arrangement in a glassware forming machine which comprises:

a frame comprising a top plate, a base member and a lateral frame member;

an operating mechanism mounted in the frame for vertical adjustment relative to the top plate;

an air supply passage formed in the lateral frame member;

a distributor block in fluid communication with the mechanism and comprising operating air passages for the supply of operating air to the mechanism, and a horizontal air passage opening from an outer face of the block to one of said operating air passages;

a right angled connector mounted in said horizontal air passage and freely rotatable about an axis of said horizontal air passage;

flexible pipe means for joining the connector to said air supply passage in the lateral frame member; and means for permitting a change of length of the flexible pipe means;

so that, on vertical adjustment of the mechanism, the adjustment may be accommodated by rotation of the connector about said axis of said horizontal air passage, flexing of the flexible pipe means and a change of length of the flexible pipe means.

2. An arrangement according to claim 1 wherein each such flexible pipe means comprises a flexible pipe one end portion of which is fixed to the connector and the other end portion of which is fixed to a sleeve which is mounted for axial movement in the corresponding air supply passage in the lateral frame member thus to provide means for permitting a change of length of the flexible pipe means.

3. An arrangement according to claim 2 wherein each air supply passage in the frame member is generally horizontal.

4. An arrangement according to claim 1 wherein the mechanism is a plunger mechanism.

5. An arrangement according to claim 4 which comprises two blocks, which are secured by bolts to a base plate of the plunger mechanism at opposite sides of the mechanism.

6. An arrangement according to claim 1 wherein the block is attached to the mechanism by bolts.

* * * * *